(12) United States Patent
Hantschel et al.

(10) Patent No.: US 6,504,152 B2
(45) Date of Patent: Jan. 7, 2003

(54) PROBE TIP CONFIGURATION AND A METHOD OF FABRICATION THEREOF

(75) Inventors: Thomas Hantschel, Amesdorf (DE); Wilfried Vandervorst, Mechelen (BE)

(73) Assignee: IMEC vzw, Leuven (BE)

( * ) Notice: Subject to any disclaimer, the term of this patent is extended or adjusted under 35 U.S.C. 154(b) by 0 days.

(21) Appl. No.: 10/005,446

(22) Filed: Dec. 3, 2001

(65) Prior Publication Data

US 2002/0040884 A1 Apr. 11, 2002

Related U.S. Application Data

(62) Division of application No. 09/134,264, filed on Aug. 14, 1998, now Pat. No. 6,328,902.

(30) Foreign Application Priority Data

Aug. 27, 1999 (EP) .............................................. 97114799

(51) Int. Cl.[7] .............................................. G01N 23/00
(52) U.S. Cl. ........................................ 250/306; 73/105
(58) Field of Search ................................. 216/2, 11, 39, 216/46, 51, 99; 250/306, 310, 311; 73/105

(56) References Cited

U.S. PATENT DOCUMENTS

| | | | |
|---|---|---|---|
| 4,835,465 A | 5/1989 | Gergin | 321/158 F |
| 5,116,462 A | 5/1992 | Bartha et al. | 156/643 |
| 5,272,913 A | 12/1993 | Toda et al. | 73/105 |
| 5,294,465 A | 3/1994 | Gallagher | 427/523 |
| 5,347,226 A | 9/1994 | Bachmann et al. | 324/724 |
| 5,357,109 A * | 10/1994 | Kusumoto | 250/306 |
| 5,357,787 A * | 10/1994 | Kado et al. | 73/105 |
| 5,360,978 A * | 11/1994 | Gueret | 250/306 |
| 5,382,795 A * | 1/1995 | Bayer et al. | 250/306 |
| 5,399,232 A | 3/1995 | Albrecht et al. | 156/633 |
| 5,475,318 A | 12/1995 | Marcus et al. | 324/762 |
| 6,011,261 A | 1/2000 | Ikeda et al. | 250/306 |
| 6,059,982 A | 5/2000 | Palagonia et al. | 216/17 |
| 6,091,124 A * | 7/2000 | Bayer et al. | 250/306 |
| 6,249,747 B1 * | 6/2001 | Binnig et al. | 369/126 |
| 2002/0125427 A1 * | 7/2001 | Chand et al. | 250/306 |

FOREIGN PATENT DOCUMENTS

| | | | |
|---|---|---|---|
| DE | 4126151 | 3/1992 | |
| EP | 382192 A1 * | 8/1990 | G11B/9/10 |
| WO | 9534000 | 12/1995 | |
| WO | 9614660 | 5/1996 | |

* cited by examiner

Primary Examiner—Anita Alanko
(74) Attorney, Agent, or Firm—McDonnell Boehnen Hulbert & Berghoff

(57) ABSTRACT

A probe tip configuration, being part of a probe (FIG. 2) for use in a scanning proximity microscope, is disclosed, comprising a cantilever beam (1) and a probe tip. Said tip comprises a first portion of a tip (2) and at least one second portion of a tip (5). Said first portion of a tip is connected to said cantilever beam whereas said second portion of a tip is placed on said first portion of a tip. Cantilever beam, first portion of a tip and second portion(s) of a tip can be composed of different materials and can be isolated each from another which makes an easy adjustment of the maximum penetration depth of the tip possible without limiting the resolution and makes it also possible to detect more than one signal of a sample at the same time using one cantilever beam. Methods of making the probe tip configuration are further described.

16 Claims, 6 Drawing Sheets

PROBE TIP CONFIGURATION AND A METHOD OF FABRICATION THEREOF

REFERENCE TO RELATED APPLICATIONS

The present application is a divisional application of U.S. patent application Ser. No. 09/134,264 filed on Aug. 14, 1998 now U.S. Pat. No. 6,328,902.

FIELD OF THE INVENTION

The present invention is related to a probe, more particular a probe tip configuration and a method of fabricating such probe tip configuration are disclosed. This probe can be used as a sensing element in a scanning proximity microscope and can also be used for characterization purposes in related fields.

BACKGROUND OF THE INVENTION

Scanning proximity microscopes (AFM, STM, MFM) operate by scanning the surface of a sample with a probe. Such a probe can be used e.g. for topography measurements or as a nano-SRP (nano-Spreading Resistance) Probe, used for the determination of the resistance and carrier profile of a semiconductor element or for nano-potentiometry measurements of the electrical potential distribution on a semiconductor element. Such a probe usually consists essentially of a mounting block, a cantilever or stylus and a tip. The choice of the materials of which the mounting block, the cantilever and the tip are composed, strongly depends on the type of measurement the probe is intended for. For topography measurement a dielectric or a semi-conductive tip can be used whereas for resistance determination and nano-potentiometry a highly conductive tip preferably with high hardness and low wear is required.

In order to achieve a high resolution the tip of such a probe must have a very small radius of curvature. A classical probe tip, as e.g. described in the U.S. Pat. No. 5,399,232 consists of a single portion. Changing the dimensions of such a probe tip, in particular increasing the height, can be necessary to meet the specifications of the measurement setup in particular e.g. the tip to sample distance. An increase of the tip height leads to a significant increase of the aspect ratio. The mechanical stability of such high aspect ratio, tips is limited, which makes them less suitable for electrical measurements where these tips are exposed to high forces being applied in order to provide a good electrical contact. Therefore stable and reliable classical probe tips can only be fabricated for a limited range of dimensions. Furthermore there is an ongoing effort and interest in continuously improving the detection resolution and consequently the probe resolution, which will even further limit the availability of reliable probe tips.

In the prior art a probe tip configuration is suggested which partly overcomes this problem. The U.S. Pat. No. 5,455,419 describes a probe tip configuration where a tip is arranged on a pedestal. By dividing the probe tip into a pedestal and a tip, one can adapt the dimensions of the pedestal according to the specifications of the measurement set-up whereas the dimensions of the tip can be optimised independently. In U.S. Pat. No. 5,455,419 tip, pedestal and cantilever are composed of a single material. It is desirable to adjust the maximum penetration depth into the sample. Because of the special tip arrangement the penetration is limited to the tip while the pedestal can make contact with the sample surface without significant penetration. The maximum penetration depth can be altered by changing the dimensions, in particular the height of the tip. But because tip and pedestal are composed of a single material this easy adjustment of a maximum penetration depth into the sample is not applicable without drastically reducing the resolution. Furthermore the characteristics of both the pedestal and the tip can not be adapted to the physical quantity to be measured using different tip shapes and materials.

Also in the prior art a method of making such a probe tip configuration is suggested. U.S. Pat. No. 5,282,924 describes a method of fabricating said probe tip configuration where a tip is arranged on a pedestal. Said tip and said pedestal are composed of a single material which does not allow an easy adjustment of a maximum penetration depth into the sample. Furthermore the characteristics of both the pedestal and the tip can not be adapted to the physical quantity to be measured using different tip shapes and materials. A further drawback of this method is that there is no solution provided to realise a highly conductive probe tip. Tip, pedestal and cantilever beam are formed out of a single substrate material such as silicon. The cited document does not describe how to fabricate a probe with a highly conductive tip preferably with high hardness and low wear as desired for e.g. resistance determination. With cited method it is also not possible to fabricate a probe where probe tip and pedestal are isolated from each other e.g. for easy penetration depth adjustment or to reduce the capacitive coupling of the probe tip configuration to the sample by forming a pedestal which is composed of insulating materials.

SUMMARY OF THE INVENTION

In an aspect of the invention a probe, more in particular a probe tip configuration, is disclosed. This probe (FIGS. 1, 3) comprises a mounting block (3) and a probe tip configuration. Said probe tip configuration comprises a cantilever beam (1) and a tip, where said cantilever beam is fixed to the mounting block at one end and said tip is fixed to the other free end of said cantilever beam. Said tip comprises at least one small tip, hereafter designated as second portion of a tip (4), placed on a larger and preferably more truncated tip, hereafter designated as first portion of a tip (2), which is connected to said end of said cantilever beam. A probe tip configuration being part of a probe for use in a scanning proximity microscope is disclosed, comprising a cantilever beam and a tip, said tip being fixed to an end of said cantilever beam, said tip comprising a first portion of a tip and a second portion of a tip, said first portion of a tip being connected to said end of said cantilever beam, said second portion of a tip being placed on said first portion of a tip, characterised in that:

said cantilever beam, said first portion of a tip and said second portion of a tip form a structure comprising at least two different materials. This probe tip configuration can be used as a sensing element in a scanning proximity microscope. The special arrangement of the present invention allows the adjustment of a maximum penetration depth into the sample surface by changing the height of the second portion of a tip. The characteristics of the second portion of a tip can be adapted to the physical quantity to be measured using different tip shapes and materials.

In another aspect of the invention a probe tip configuration (FIGS. 2, 4) being part of a probe for use in a scanning proximity microscope is disclosed, comprising a cantilever beam (1) and a tip, said tip being fixed to an end of said cantilever beam, characterised in that, said tip comprises a first portion of a tip (2) and more then one second portion of a tip (5), said first portion of a tip being connected to said end of said cantilever beam, said second portions of a tip being placed on said first portion of a tip. This probe tip configuration makes it possible to detect more than one signal of a sample at the same time using only one cantilever beam (1). The different second portions of a tip can be electrically and/or thermally isolated from each other and can have different characteristics. The different second portions of a tip can also be used to detect different physical quantities. In particular this probe tip configuration allows the use of one or more second portions of a tip as a current or voltage source. In this way, the other second portions of a tip can be used to detect the generated signal.

In a further aspect of the invention a method of fabricating a probe tip configuration is disclosed comprising a cantilever beam and a probe tip, said probe tip comprising a first portion of a tip and at least one second portion of a tip, said method comprising the steps of:

etching a substrate using a first patterned hard mask layer as an etch mask, said etching step creating a first etch pit;

etching at least one second small etch pit on the bottom of said first etch pit using a second patterned hard mask layer as an etch mask;

defining the cantilever beam by removing the exposed parts of said first hard mask layer;

covering the complete etched structure with at least one material thereby forming said first portion of a tip and said second portion of a tip;

etching through a mask window at the backside of said substrate to thereby form said cantilever beam and simultaneously etching free said first portion of a tip and said second portion of a tip.

In still a further aspect of the invention a method of fabricating a probe tip configuration is disclosed where the tip comprises a first portion of a tip and one second portion of a tip. The shape of the first portion of a tip is achieved by etching the substrate. The shape can be a truncated pyramid, a truncated cone, a cylinder. In particular a truncated pyramidal shape can be realised by employing an etching solution such as KOH for the etching of the substrate, which results in a more truncated pyramidal etch pit. Then a second portion of a tip can be formed on said first portion of a tip. Therefore a small etch pit on the bottom of the first etch pit is formed preferably by an anisotropic etching procedure resulting in a pyramidal or a conic shape. The complete etched structure is covered with one or more materials and the substrate is finally removed using a thinning window at the backside of the substrate resulting in a first portion of a tip and a preferably pyramidal or conic shaped second portion of a tip having a very small radius of curvature. First portion of a tip and second portion of a tip can also be composed of different materials.

In still another aspect of the invention a method of fabricating a probe tip configuration is disclosed where the tip comprises a first portion of a tip and at least two second portions of a tip. The shape of the first portion of a tip is achieved by etching the substrate. The shape can be a truncated pyramid, a truncated cone, a cylinder. In particular a truncated pyramidal shape can be realised e.g. by employing an etching solution such as KOH for the etching of the substrate which results in a more truncated pyramidal etch pit. Then at least one second portion of a tip can be formed on said first portion of a tip. Therefore at least one small etch pit on the bottom of the first etch pit is formed preferably by an anisotropic etching procedure resulting in pyramidal or conic shapes. The complete etched structure is covered with one or more materials and the substrate is finally removed using a thinning window at the backside of the substrate resulting in a first portion of a tip and a preferably pyramidal or conic shaped second portion of a tip having a very small radius of curvature in order to achieve high resolution. First portion of a tip and second portion of a tip can also be composed of different materials. The different second portions of a tip can be electrically and/or thermally isolated from each other.

DETAILED DESCRIPTION OF THE INVENTION

Figure 1:
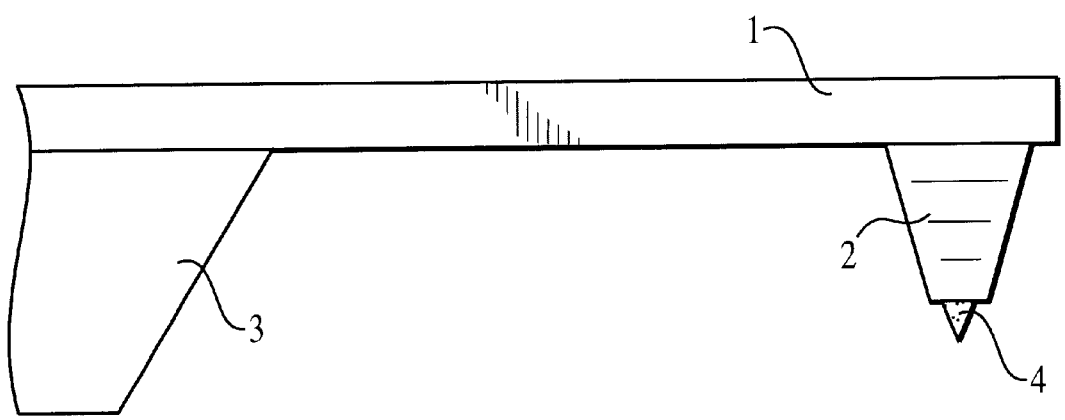
FIG. 1 shows one particular schematic representation of a probe tip configuration comprising a first portion of a tip and a second portion of a tip, said small second portion of a tip being placed on top of the larger first portion of a tip.
Figure 2:
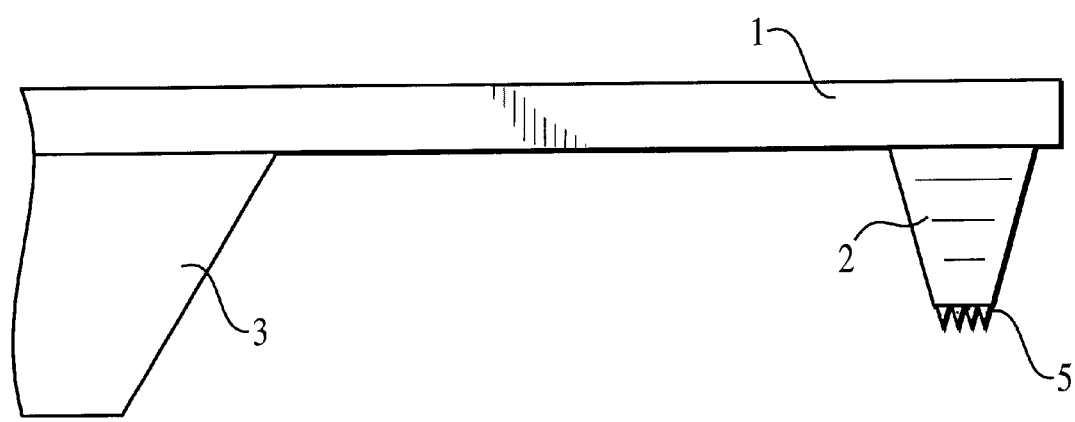
FIG. 2 shows one particular schematic representation of a probe tip configuration comprising a first portion of a tip and two or more second portions of a tip, said small second portions of a tip being placed on top of the larger first portion of a tip.
Figure 3:
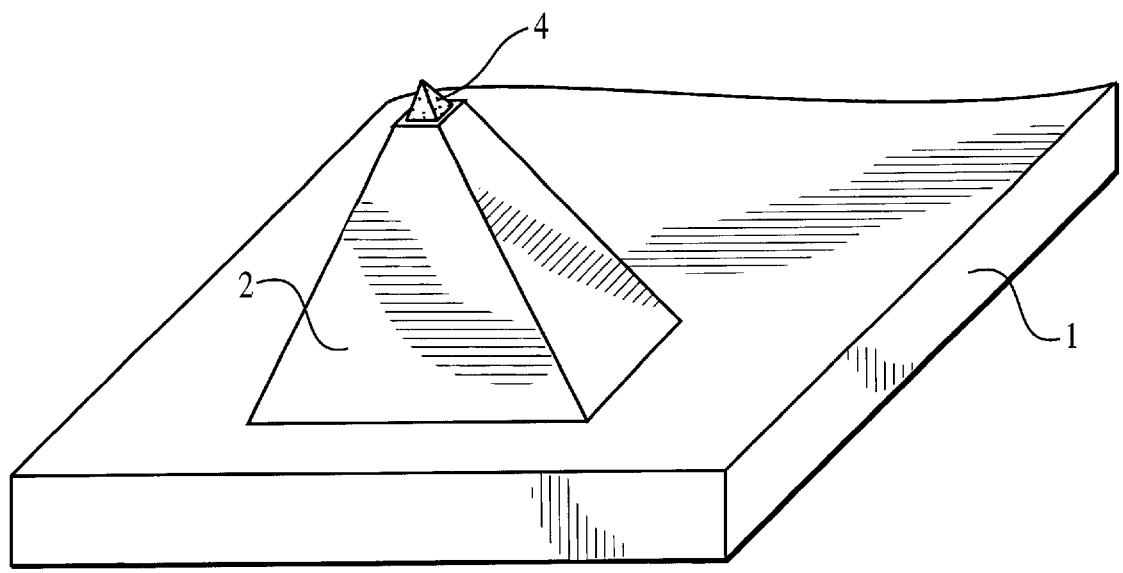
FIG. 3 shows one particular schematic representation of a probe tip configuration, having a pyramidal shaped first portion of a tip and a pyramidal shaped second portion of a tip.
Figure 4:
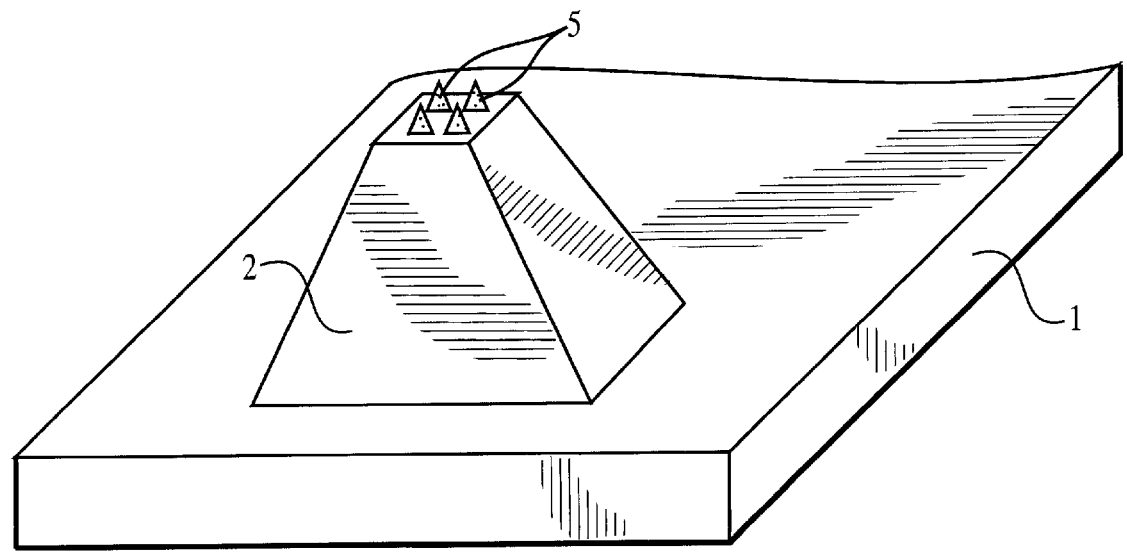
FIG. 4 shows one particular schematic representation of a probe tip configuration, both first portion of a tip and second portions of a tip having a pyramidal shape.
Figure 5A:
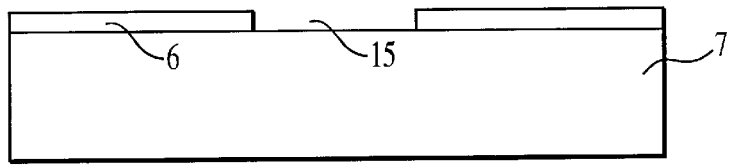
FIG. 5 contains the schematic description of a process flow, used to fabricate a probe tip configuration as shown in FIG. 3, according a particular embodiment of the invention.
Figure 5B:
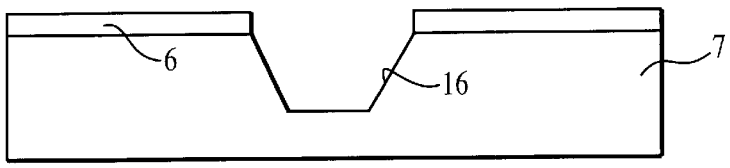
Figure 5C:
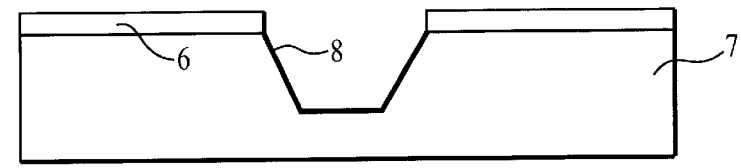
Figure 5D:
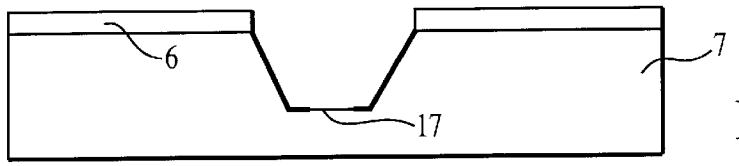
Figure 5E:
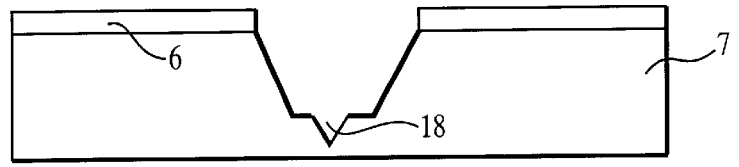
Figure 5F:
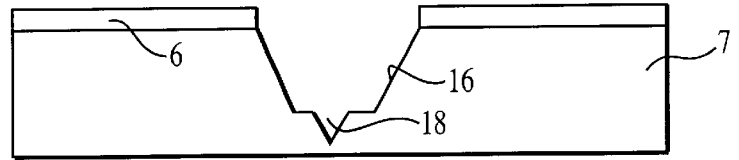
Figure 5G:
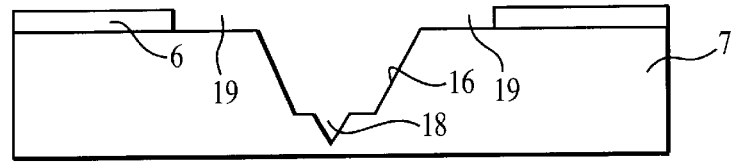
Figure 5H:
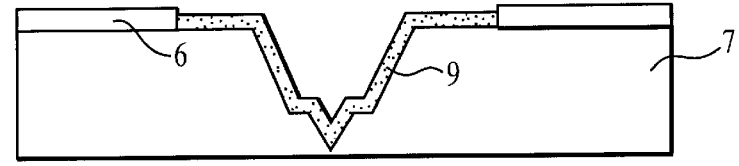
Figure 5I:
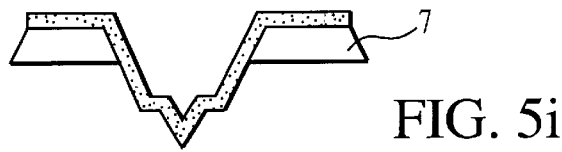
Figure 6A:
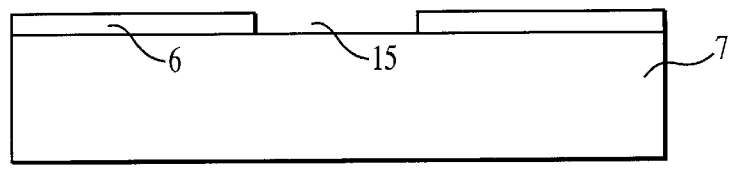
FIG. 6 contains the schematic description of a process flow, used to fabricate a probe tip configuration as shown in FIG. 4, according a particular embodiment of the invention.
Figure 6B:
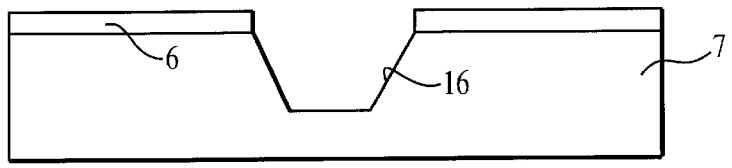
Figure 6C:
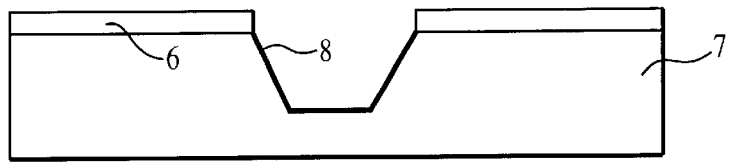
Figure 6D:
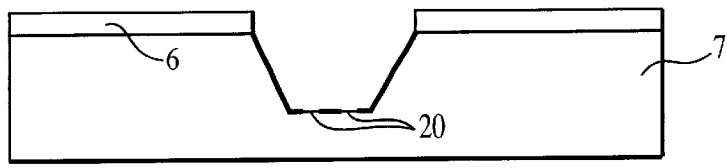
Figure 6E:
Figure 6F:
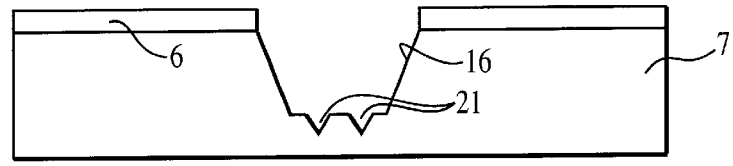
Figure 6G:
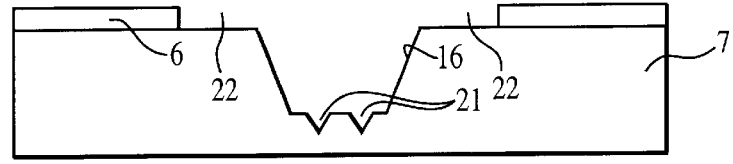
Figure 6H:
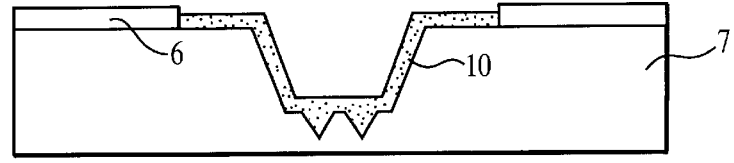
Figure 6I:
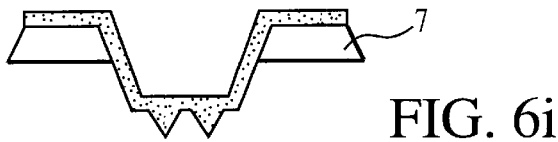

In relation to the appended drawings the present invention is described in detail in the sequel. Several embodiments are disclosed. It is apparent however that a person skilled in the art can imagine several other equivalent embodiments or other ways of practising the present invention, the spirit and scope thereof being limited only by the terms of the appended claims.

In an embodiment of the invention a probe (FIGS. 1, 2, 3, 4), more in particular a probe tip configuration for use in scanning proximity microscopes is disclosed. This probe comprises a mounting block (3) and a probe tip configuration. Said probe tip configuration comprises a cantilever beam (1) and a tip, where said cantilever beam is fixed to a mounting block at one end and said tip is fixed to the other free end of said cantilever beam. Said tip comprises at least one small tip, hereafter designated as second portion of a tip (5), placed on a larger and preferably more truncated tip, hereafter designated as first portion of a tip (2), which is connected to said end of said cantilever beam.

In a particular embodiment of the invention a probe tip configuration is disclosed where the tip comprises a first portion of a tip (2) and one second portion of a tip (4). This probe tip configuration can be used as a sensing element in a scanning proximity microscope. This special tip arrangement allows the adjustment of a maximum penetration depth into the sample, because the penetration is limited to the second portion of a tip. The first portion of a tip can make contact with the sample surface without significant penetration because of its truncated shape and without limiting the resolution because the first portion of a tip can be electrically and/or thermally and/or magnetically isolated from the second portion of a tip. Remark that even without said first portion of a tip making contact there is a significant advantage for electrical measurements because by isolating the first portion of the tip the interaction, e.g. the capacitive coupling, with the substrate is reduced. The maximum penetration depth can be altered by changing the dimensions, in particular the height of the second portion of a tip. The characteristics of both the first portion of a tip and the second portion of a tip can be adapted to the physical quantity to be measured using different tip shapes and materials. This probe tip configuration can be used in a scanning proximity microscope, such as an AFM (Atomic Force Microscope), for topography measurements. This probe tip configuration is also especially suited as a nano-SRP (nano-Spreading Resistance) probe, used for the determination of the resistance and carrier profile of a semiconductor element. Furthermore, this probe tip configuration is also suited for nano-potentiometry measurements of the electrical potential distribution on a semiconductor element. For the latter kind of measurements, a highly conductive tip is especially suited. The probe tip configuration may however also be used for other applications then the ones mentioned above.

In another embodiment of the invention a probe tip configuration is disclosed where the tip comprises a first portion of a tip (2) and two or more second portions of a tip (5) on top of the first portion of a tip which makes it possible to detect more than one signal at the same time using only one cantilever beam. The different second portions of a tip can be electrically and/or thermally and/or magnetically isolated from each other and can have different characteristics. The different second portions of a tip can also be used to detect different physical quantities. In particular this probe tip configuration allows the use of one or more second portions of a tip as a current or voltage source. In this way, the other second portions of a tip can be used to detect the generated signal(s).

The different parts of the probe as mounting block (3), cantilever beam (1), first portion of a tip (2), and second portion(s) of a tip (5) can be composed of the same material or different materials. Such materials may be for example Si, $SiO_2$, $Si_3N_4$, metals, and diamond. Depending on the application, the properties of the probe may be further improved by additional coatings, such as metals, hard metals, diamond, cubic boron nitride, $SiO_2$, and $Si_3N_4$. Depending on the application and the used microscope, the cantilever beam and the mounting block can have different shapes and different dimensions. In a classical probe tip consisting of a single tip, changing the dimensions of the probe tip, in particular increasing the height, does increase the aspect ratio significantly The mechanical stability of such high aspect ratio tips is limited, which makes them less suitable for electrical measurements where these tips are exposed to high forces being applied in order to provide a good electrical contact. Therefore this classical probe tip is only useful for a limited range of dimensions. The division of the probe tip into first portion of a tip and second portion of a tip in the present invention has the advantage that the first portion of a tip can be adapted to the measurement set-up whereas the second portion of a tip can be optimised concerning the physical quantity to be measured. So there is no longer a direct coupling between the aspect ratio of the probe tip, mainly determined by the first portion of a tip, and the tip radius of the probe tip, which is determined by the second portion of a tip. The first portion of a tip can have the shape of a truncated pyramid, a truncated cone or a cylinder. The height and width of the first portion of a tip depends on the limitations of the measurement set-up, as the required probe to sample distance, and can be adjusted in a wide range by changing the dimensions of the etch mask opening and/or by changing the etch procedure. The dimensions and the properties of the second portion of a tip depend on the sample surface to be analysed, on the physical quantity to be measured and on the desired resolution. A physical quantity to be measured with a probe tip configuration with one second portion of a tip or with more then one second portion of a tip can be, e.g. the electrical current, the electrical potential distribution, the topography of the sample, magnetic forces, electrostatic forces, and the thermal distribution. According to the physical quantity to be measured, the second portion of a tip may be magnetic, electrical and/or thermal conductive. In order to achieve high resolution, the second portion of a tip preferably has a small radius of curvature. Additional special materials can be employed in order to get a second portion of a tip with high hardness and low wear. The present invention allows the adjustment of a maximum sample penetration depth by changing the height of the second portion of a tip. The second portion of a tip is preferably pyramidal or conic shaped. The arrangement of the present invention makes it possible to produce AFM-probes with a small aspect ratio of the tip which are of interest for special electrical measurements. A higher aspect ratio as it is desired for topography measurements may also be achieved using a more cylindrical or conic shape for the second portion of a tip. The different second portions of a tip of a probe configuration with more then one second portion of a tip can be electrically isolated. The isolated second portions of a tip can be used to detect more than one signal at the same time using only one cantilever beam. In this configuration some second portions of a tip may be used as a current or voltage source whereas other second portions of a tip may be used to detect the generated signals. A probe tip configuration with two electrical isolated second portions of a tip can be used in nano-SRP for the measurement of the spreading resistance without having a back contact and with four electrical isolated second portions of a tip can be employed for localised FPR-measurements (Four-Point-Resistance).

The probes of the prior art can also be used for spreading resistance measurements but then also a contact at the backside of the sample has to be provided. Therefore a probe tip configuration with more then one second portion of a tip as described is desirable. A probe tip configuration with two electrical isolated second portions of a tip can be used in nano-SRP for the measurement of the spreading resistance without having a back contact and with four electrical isolated second portions of a tip can be employed for localised FPR-measurements. U.S. Pat. No. 5,540,958 describes a probe with two cantilevers each having a tip. A first drawback of this solution is that one needs to control each cantilever separately which is much more complicated and unreliable then in the present invention. A second drawback is that by using two cantilevers the distance between the probe tips is about ten times greater then in the invention because each cantilever has a certain minimal width mainly for stability reasons and there is also a minimal distance between the cantilever to allow proper use of such a probe.

In an embodiment of the invention a method of fabricating a probe tip configuration is disclosed where the tip comprises a first portion of a tip and one second portion of a tip. The shape of the first portion of a tip is achieved by etching the substrate. The shape can be a truncated pyramid, a truncated cone, a cylinder. In particular a truncated pyramidal shape can be realised by employing an etching solution such as KOH for the etching of the substrate, e.g. silicon, which results in a more truncated pyramidal etch pit. Then a second portion of a tip can be formed on top of said first portion of a tip. Therefore a small etch pit on the bottom of the first etch pit is formed preferably by an anisotropic etching procedure resulting in pyramidal shape. The complete etched structure is covered with one or more materials and the substrate is finally removed using a thinning window at the backside of the substrate resulting in a first portion of a tip and a preferably pyramidal or conic shaped second portion of a tip having a very small radius of curvature in order to achieve a high resolution. First portion of a tip and second portion of a tip can also be composed of different materials. In another embodiment of the invention a method of fabricating a probe tip configuration is disclosed where the tip comprises a first portion of a tip and more then one second portion of a tip. The shape of the first portion of a tip is achieved by etching the substrate. The shape can be a truncated pyramid, a truncated cone, a cylinder. In particular a truncated pyramidal shape can be realised by employing an etching solution such as KOH for the etching of the substrate, e.g. silicon, which results in a more truncated pyramidal etch pit. Then at least one second portion of a tip can be formed on top of said first portion of a tip. Therefore at least one small etch pit on the bottom of the first etch pit is formed preferably by an anisotropic etching procedure resulting in pyramidal shapes. The complete etched structure is covered with one or more materials and the substrate is finally removed using a thinning window at the backside of the substrate resulting in a first portion of a tip and a preferably pyramidal or conic shaped second portion of a tip having a very small radius of curvature. First portion of a tip and second portion of a tip can also be composed of different materials. The different second portions of a tip can be electrically and/or thermally isolated from each other.

In a particular embodiment of the invention a detailed process scheme (FIG. 5) for making a probe tip configuration is described. It is clear that some of the applied process steps and materials may be replaced by others giving the same result.

As a starting material a substrate (7), which can be, e.g. a silicon or a glass wafer, is used. In the example a (100) oriented Silicon wafer is used.

The substrate is covered with a first hard mask layer (6) by means of oxidation or a deposition technique. This hard mask layer (6) can be selected from the group of silicon oxides, silicon nitrides, silicon oxynitrides, metals or a combination thereof.

This hard mask layer (6) is patterned (15, FIG. 5, step a) by means of a dry etch procedure, a wet etch procedure or a combination thereof using a lithographic developed resist as a mask. This first hard mask layer (6) is used as an etch mask layer for the formation of the inverted truncated first portion of a tip.

The substrate (7) is then exposed to an etching solution (FIG. 5, step b). The choice of the etching solution determines the shape of the first portion of a tip which can be truncated pyramidal, truncated conic, cylindrical. When choosing an etching solution, such as KOH, the shape is truncated pyramidal. The etching has to be stopped when the truncated inverted pyramid (16) is formed. A good control over the etch depth is required. This can be done by careful controlling the important parameters such as the size of the etch window in the hard mask layer, the etching solution and the etching time.

The side walls and the bottom of the etch pit (16) are then covered with a second hard mask layer (8). This can be done by oxidation, PECVD (Plasma Enhanced Chemical Vapour Deposition) or metal deposition. This hard mask layer (8) can be selected from the group of silicon oxides, silicon nitrides, silicon oxynitrides, metals or a combination thereof.

The second hard mask layer (8) is patterned (17, FIG. 5, step d) by means of a dry etch procedure, a wet etch procedure or a combination thereof using an optical or e-beam lithographic developed resist as a mask. As an alternative also a focused ion beam can be used to open this second hard mask layer. Regardless of the method used, a small square or circular opening (17) in the second hard mask layer is formed at the bottom of the inverted first portion (16) of a tip. This second hard mask layer (8) is used as an etch mask for the formation of at least one inverted second portion of a tip.

The sample is then exposed to the anisotropic etchant, e.g. KOH, (FIG. 5, step e) and at least one small inverted second portion (18) of a tip, having a conic or pyramidal shape, is formed at the bottom of the truncated inverted first portion (16) of a tip.

The second hard mask layer (8) inside the truncated inverted first portion of a tip is removed (FIG. 5, step f) using a lithographic developed resist as a mask by means of a wet etching step and/or a dry etching step. In an alternative way the second hard mask layer (8) remains as it is and if the hard mask layer (8) is a non-conductive layer, said hard mask layer (8) thereby acting as an insulating layer for the first portion of a tip. However the metal (or other material) coverage of the second portion of a tip is more difficult to realise because of the increased etch pit depth. Therefore it is preferable to remove the second hard mask layer (8) at this stage and to provide a dielectric (or thermal) insulating layer or even a conductive layer during selective multilayer deposition step later in the processing.

Next, the cantilever and cantilever beam are defined by removing the exposed parts (19) of the first hard mask layer (6) (FIG. 5, step g), using a lithographic developed resist as a mask, by means of a wet etching step and/or a dry etching step. In an alternative way the first hard mask layer (6) can remain as it is thereby serving as a first insulating or conductive layer.

At least one layer of at least one material (9) is then deposited (FIG. 5, step h) in the patterned area. This can be done by deposition (e.g. a metal) over the whole surface followed by a lift-off step. Alternatives are by plating (e.g. nickel, gold), by selective deposition (e.g. diamond). This procedure can be performed for the whole exposed area at once or in different steps for the different areas like first portion of a tip, second portion of a tip, cantilever and cantilever beam. Said steps can include process steps as lithography, deposition of conducting and/or non-conducting materials, and etching steps.

The cantilever and cantilever beam are formed and the first portion of a tip and second portion of a tip are etched free (FIG. 5, step i) from the substrate (7). This can be done by wet and/or dry etching using a thinning window at the backside of the substrate (7). In another particular embodiment of the invention a detailed process scheme (FIG. 6) for making a probe tip configuration (see FIG. 7) comprising a first portion of a tip (FIG. 7, (2)) and more than one second portion (FIG. 7, (11)) of a tip is disclosed. It is clear that some of the applied process steps and materials may be replaced by others giving the same result.

As a starting material a substrate (7), which can be for example a silicon or a glass wafer, is used. In the example a (100) oriented silicon wafer is used.

With reference to FIG. 6, the substrate is covered with a first hard mask layer (6) by means of oxidation or a deposition technique. This hard mask layer (6) can be selected from the group of silicon oxides, silicon nitrides, silicon oxynitrides, metals or a combination thereof.

This hard mask layer (6) is patterned (15, FIG. 6, step a) by means of a dry etch procedure, a wet etch procedure or a combination thereof using a lithographic developed resist as a mask. This first hard mask layer (6) is used as an etch mask layer for the formation of the inverted truncated first portion ((2), FIG. 7) of a tip.

The substrate is then exposed to an etching solution (FIG. 6, step b). The choice of the etching solution determines the shape of the first portion ((2), FIG. 7) of a tip which can be truncated pyramidal, truncated conic, cylindrical. When choosing an etching solution, particularly when choosing KOH, the shape is truncated pyramidal. The etching has to be stopped when the truncated inverted pyramid (16) is formed. A good control over the etch depth is required. This can be done by careful controlling the important parameters such as the size of the etch window in the hard mask layer (6), the etching solution and the etching time.

The side walls and the bottom of the etch pit (16) are then covered with a second hard mask layer (8). This can be done by oxidation, PECVD (Plasma Enhanced Chemical Vapour Deposition) or metal deposition. This hard mask layer (8) can be selected from the group of silicon oxides, silicon nitrides, silicon oxynitrides, metals or a combination thereof.

The second hard mask layer (8) is patterned (FIG. 6, step d) by means of a dry etch procedure, a wet etch procedure or a combination thereof using an optical or e-beam lithographic developed resist as a mask. As an alternative also a focused ion beam can be used to open this second hard mask layer. Regardless of the method used, small squares or circular openings (20) in the second hard mask layer (8) are formed at the bottom of the etch pit (16). This second hard mask layer (8) is used as an etch mask for the formation of the inverted second portions ( FIG. 7, (11)) of a tip.

The sample is then exposed to the anisotropic etchant, e.g. KOH (FIG. 6, step e) and at least two inverted second portions (21) of a tip, having a conic or pyramidal shape, are formed at the bottom of the etch pit (16).

The second hard mask layer (8) inside the truncated etch pit (16) is optionally removed (FIG. 6, step f) using a lithographic developed resist as a mask by means of a wet etching step and/or a dry etching step. In an alternative way the second hard mask layer (8) remains as it is and if the hard mask layer (8) is a non-conductive layer, said hard mask layer (8) thereby serving as an insulating layer for the first portion (FIG. 7, (2)) of a tip and as insulating layer between the different second portions (FIG. 7, (11)) of a tip. However the metal (or other material) coverage of the second portions (11) of a tip is more difficult to realise because of the increased etch pit depth. Therefore it is preferable to remove the second hard mask layer (8) at this stage and to provide a dielectric (or thermal) insulating layer or even a conductive layer during selective multilayer deposition step later in the processing.

Figure 7A:
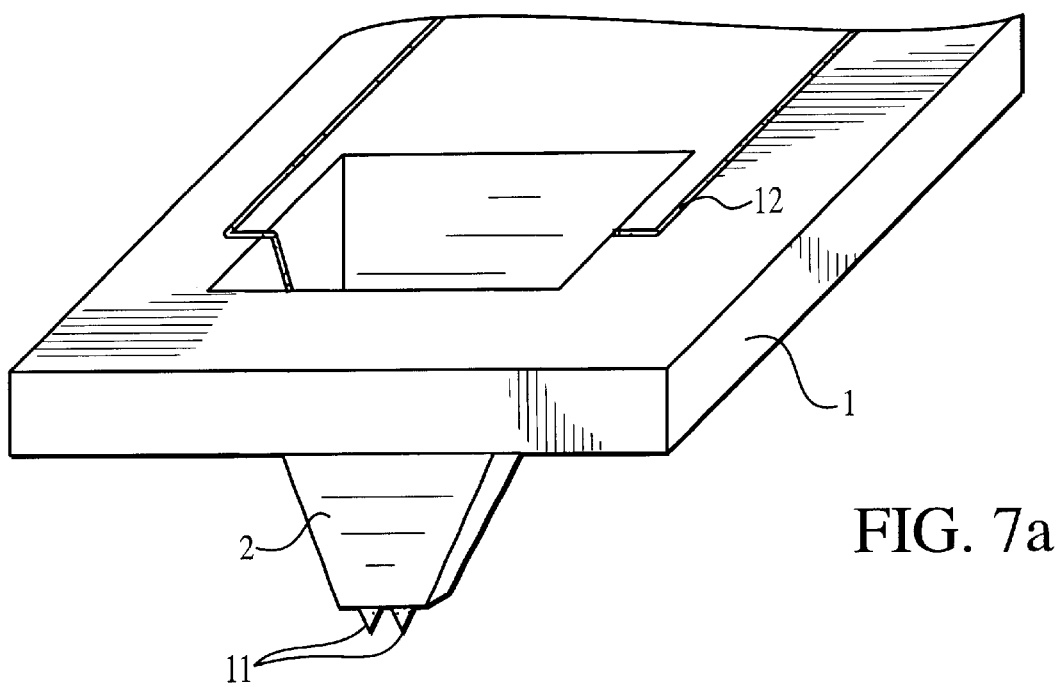
FIG. 7 shows one particular schematic representation of a probe tip configuration comprising a first portion of a tip and two second portions of a tip, said small second portions of a tip being placed on the larger first portion of a tip, said first portion of a tip and said second portions of a tip each being isolated one from another.
Figure 7B:
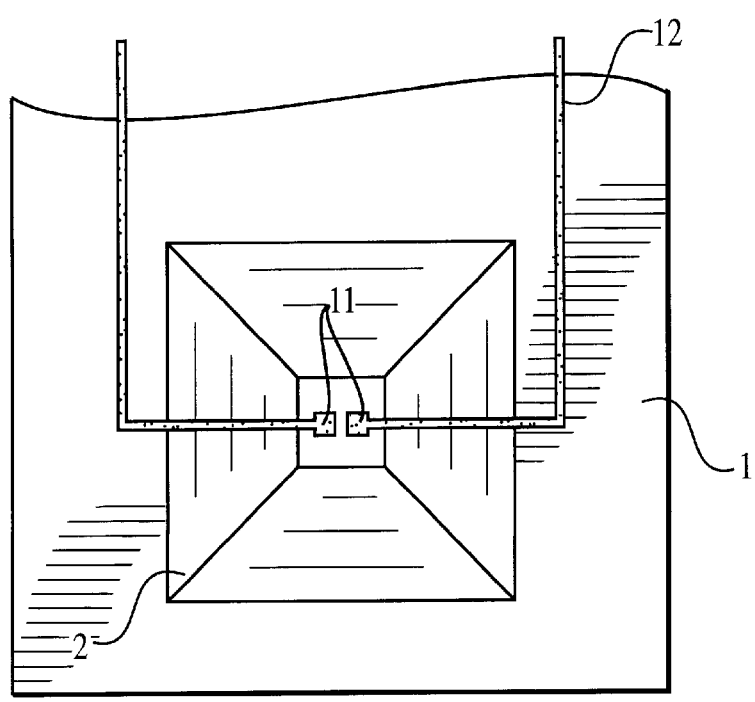

Next, the cantilever and cantilever beam (FIG. 7, (1)) are defined (FIG. 6, step g) by removing the exposed parts (22) of the first hard mask layer (6), using a lithographic developed resist as a mask, by means of a wet etching step and/or a dry etching step. In an alternative way the first hard mask layer (6) can remain as it is thereby serving as a first insulating or conductive layer.

At least one layer of at least one material (10) is then deposited (FIG. 6, step h) in the patterned area. This can be done by deposition (e.g. a metal) over the whole surface followed by a lift-off step. Alternatives are by plating (e.g. nickel, gold), by selective deposition (e.g. diamond). This procedure can be performed for the whole exposed area at once or in different steps for the different areas or parts of the different areas like first portion ((2) in FIG. 7) of a tip, second portions ((11) in FIG. 7) of a tip, and cantilever beam ((1) in FIG. 7). At this point, additional process steps may be carried out in order to isolate the different second portions of a tip (FIG. 7, (11)) one from another and/or to isolate the first portion (FIG. 7, (2)) of a tip from the second portion(s) (FIG. 7, (11)) of a tip and/or to isolate the connections (FIG. 7, (12)) to the second portions (11) of a tip from the cantilever beam (1). Said isolation can be an electrical and/or thermal and/or magnetic isolation. Said steps can include process steps such as lithography, deposition of conductive and/or non-conductive materials, and etching steps. The different second portions (11) of a tip of a probe configuration with more then on second portion (2) of a tip can be electrically isolated. This can be done using additional process steps such as optical or e-beam lithography combined with metal deposition, focused ion beam induced metal deposition or electron beam induced metal deposition. The isolated tips (2) can be used to detect more than one signal at the same time using only one cantilever beam (1). In this configuration some second portions (11) of a tip can be used as a current or voltage source whereas other second portions of a tip can be used to detect the generated signals. A probe tip configuration with two electrical isolated second portions of a tip can be used in nanoSRP for the measurement of the spreading resistance without having a back contact and with four electrical isolated second portions of a tip can be employed four localised FPR-measurements (Four-Point-Resistance).

Additional process steps can be employed in order to get a second portion of a tip with high hardness and low wear. An improved probe performance may also be achieved by an additional implantation, diffusion or silicidation step or by depositing additional coatings such as metals, hard metals, diamond, and cubic boron nitride.

The cantilever and cantilever beam (1) are formed and the first portion (2) of a tip and second portions (11) of a tip are etched free (FIG. 6, step i) of the substrate (7). This can be done by wet and/or dry etching using a thinning window at the backside of the substrate (7).

In still another embodiment of the invention an alternative method (FIG. 8) of fabricating a probe tip configuration comprising a first portion of a tip and at least one second portion of a tip is disclosed.

The present invention includes a method of fabricating a probe tip configuration comprising a cantilever beam and a probe tip, said probe tip comprising a first portion of a tip and at least two second portions of a tip, said method comprising the steps of:

covering a substrate with a hard mask layer;

patterning said hard mask layer thereby forming an etch mask, said etch mask comprising a mask for said cantilever beam, said first portion of a tip, and said second portions of a tip;

etching through a mask window at the backside of said substrate to thereby thin down the substrate to a desired thickness transferring said etch mask into the substrate to thereby form said cantilever beam and etching free said first portion of a tip and said second portions of a tip.

The method will be described with reference to FIG. 8. A substrate (13) is covered (FIG. 8, step a) with a hard mask layer (14) by means of oxidation or a deposition technique. This hard mask layer is used as an etch mask and can be selected from the group of silicon oxides, silicon nitrides, silicon oxynitrides, metals or a combination thereof.

The etch mask is patterned by three lithographic steps each of them followed by an etching procedure, which can be a dry etch procedure, a wet etch procedure or a combination thereof, in order to transfer the pattern of a lithographic developed resist to the hard mask layer (FIG. 8, step b). As a result, the etch mask contains the mask (23) for the cantilever, the mask (24) for the first portion of a tip, and the mask (25) for the second portion(s) of a tip. The number of the small circular or square structures (25) on top of the etch mask depends on the number of second portions of a tip to be generated.

The cantilever beam (26) is etched (FIG. 8, step c) and then the etch mask (23) for the cantilever beam is removed (FIG. 8, step d). Next, the first portion (27) of a tip (FIG. 8, step e) is etched and the etch mask (24) for the first portion (27) of a tip is then removed (FIG. 8, step f). The small structure(s) (25) on top of the first portion of a tip will finally be underetched (FIG. 8, step g) resulting in a first portion (27) of a tip connected to a cantilever beam (26) with small second portion(s) (28) of a tip on top.

Figure 8A:
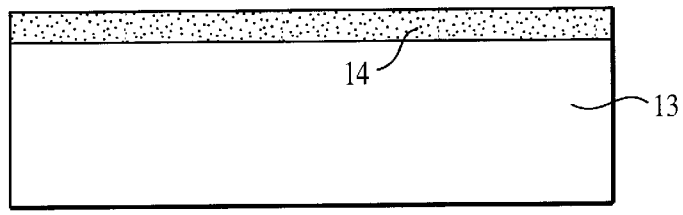
FIG. 8 contains the schematic description of a process flow, used to fabricate a probe tip configuration, according to a particular embodiment of the invention.
Figure 8B:
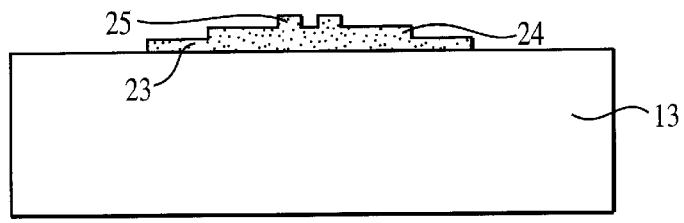
Figure 8C:
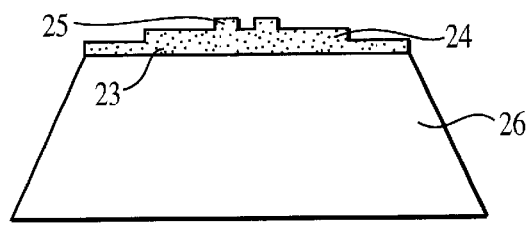
Figure 8D:
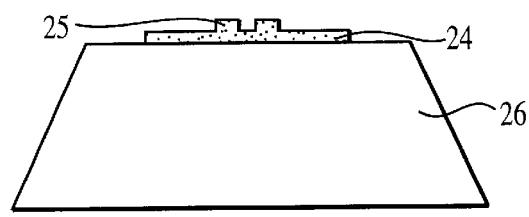
Figure 8E:
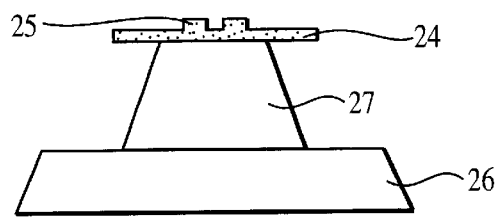
Figure 8F:
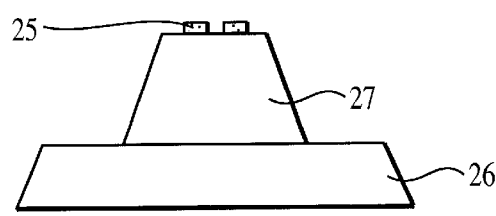
Figure 8G:
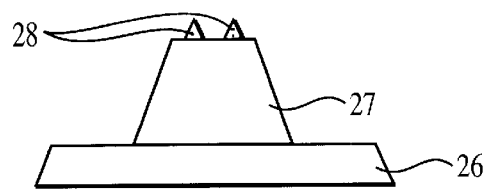

The resulting probe tip configuration shown schematically in FIG. 8g is composed of a single substrate material such as silicon. For e.g. resistance determination a highly conductive tip is necessary. Additional process steps can be carried out to increase the conductivity and the hardness of the probe. This may be achieved by an implantation or silicidation step or by additional coatings such as metals, hard metals, diamond, and cubic boron nitride.

A drawback of this method is that these additional steps often lead to an increased tip radius thereby limiting the resolution of the probe.

Furthermore, to make the probe tip configuration with more then one second portion of a tip useful for e.g. spreading resistance measurements or four points resistance measurements, additional process steps are carried out in order to get second portions of a tip which are electrically and/or thermally and/or magnetically isolated one from another.

What is claimed:

1. A probe tip configuration being part of a probe for use in a scanning proximity microscope, comprising a cantilever beam and a tip, said tip being fixed to an end of said cantilever beam, characterized in that, said tip comprises a first portion of the tip and at least two second portions of the tip, said first portion comprising at least a first and a second surface, the first surface of the first portion of the tip being connected to said end of said cantilever beam, said second portions of the tip being placed on said second surface of said first portion of the tip, where said first portion of the tip and each of said second portions of the tip are isolated one from another.

2. A probe tip configuration as recited in claim 1 where said isolation is at least one kind of isolation selected from the group consisting of thermal isolation, electrical isolation and magnetic isolation.

3. A probe tip configuration being part of a probe for use in a scanning proximity microscope, comprising a cantilever beam and a tip, said tip being fixed to an end of said cantilever beam, characterized in that, said tip comprises a first portion of the tip and at least two second portions of the tip, said first portion comprising at least a first and a second surface, the first surface of the first portion of the tip being connected to said end of said cantilever beam, said second portions having surfaces, said surfaces of said second portions of the tip being placed on said second surface of said first portion of the tip, wherein said second surface of said first portion has a surface area, wherein said surfaces of said second portions having a total surface area, and wherein said surface area of said second surface is greater than said total surface area of said surfaces of said second portions, said cantilever beam, said first portion of the tip and said second portions of the tip forming a structure being composed of at least one material, said material being selected from the group of oxides, nitrides, and oxynitrides.

4. A probe tip configuration being part of a probe for use in a scanning proximity microscope, comprising a cantilever beam and a tip, said tip being fixed to an end of said cantilever beam, characterized in that, said tip comprises a first portion of the tip and at least two second portions of the tip, said first portion comprising at least a first and a second surface, the first surface of the first portion of the tip being connected to said end of said cantilever beam, said second portions having surfaces, said surfaces of said second portions of the tip being placed on said second surface of said first portion of the tip, wherein said second surface of said fist portion has a surface area, wherein said surfaces of said second portions having a total surface area, wherein said surface area of said second surface is greater than said total surface area of said surfaces of said second portions, and wherein said at least two second portions are disposed in the same direction.

5. A probe tip configuration being part of a probe for use in a scanning proximity microscope, comprising a cantilever beam and a tip, said tip being fixed to an end of said cantilever beam, characterized in that, said tip comprises a first portion of the tip and at least two second portions of the tip, said first portion comprising at least a first and a second surface, the first surface of the first portion of the tip being connected to said end of said cantilever beam, said second portions having surfaces, said surfaces of said second portions of the tip being placed on said second surface of said first portion of the tip, wherein said second surface of said first portion has a surface area, wherein said surfaces of said second portions having a total surface area, wherein said surface area of said second surface is greater than said total surface area of said surfaces of said second portions, and wherein each of said second portions of the tip are isolated one from another.

6. A probe tip configuration as recited in claim 5 wherein said isolation is at least one kind of isolation selected from the group consisting of thermal isolation, electrical isolation and magnetic isolation.

7. A probe tip configuration being part of a probe for use in a scanning proximity microscope, comprising a cantilever beam and a tip, said tip being fixed to an end of said cantilever beam, characterizd in that, said tip comprises a first portion of the tip and at least two second portions of the tip, said first portion comprising at least a first and a second surface, the first surface of the first portion of the tip being connected to said end of said cantilever beam, said second portions having surfaces, said surfaces of said second portions of the tip being placed on said second surface of said first portion of the tip, wherein said second surface of said first portion has a surface area, wherein said surfaces of said second portions having a total surface area, wherein said surface area of said second surface is greater than said total surface area of said surfaces of said second portions, and wherein said first portion of the tip and each of said second portions of the tip are isolated one from another.

8. A probe tip configuration as recited in claim 7, wherein said second portions of the tip are used to detect more than one signal simultaneously using one cantilever beam.

9. A probe tip configuration as recited in claim 7, wherein said second portions of the tip are nano-spreading resistance probes.

10. A probe tip configuration as recited in claim 7, wherein said at least two second portions comprise four second portions, and wherein said four second portions of the tip measure four localized Four-Point Resistance measurements.

11. A probe tip configuration being part of a probe for use in a scanning proximity microscope, comprising a cantilever beam and a tip, said tip being fixed to an end of said cantilever beam, characterized in that, said tip comprises a first portion of the tip and at least two second portions of the tip, said first portion comprising at least a first and a second surface, the first surface of the first portion of the tip being connected to said end of said cantilever beam, said second portions having surfaces, said surfaces of said second portions of the tip being placed on said second surface of said first portion of the tip, wherein said second surface of said first portion has a surface area, wherein said surfaces of said second portions having a total surface area, wherein said surface area of said second surface is greater than said total surface area of said surfaces of said second portions, and wherein said second surface of the first portion of the tip is a flat surface.

12. A probe tip configuration as recited in claim 1, wherein said second portions of the tip are used to detect more than one signal simultaneously using one cantilever beam.

13. A probe tip configuration as recited in claim 1, wherein said second portions of the tip are nano-spreading resistance probes.

14. A probe tip configuration as recited in claim 1, wherein said at least two second portions comprise four second portions, and wherein said four second portions of the tip measure four localized Four-Point Resistance measurements.

15. A probe tip configuration being part of a probe for use in a scanning proximity microscope, comprising a cantilever beam and a tip, said tip being fixed to an end of said cantilever beam, characterized in that, said tip comprises a first portion of the tip and at least two second portions of the tip, said first portion comprising at least a first and a second surface, the first surface of the first portion of the tip being connected to said end of said cantilever beam, said second portions of the tip being placed on said second surface of said first portion of the tip, wherein said at least two second portions are disposed in the same direction.

16. A probe tip configuration being part of a probe for use in a scanning proximity microscope, comprising a cantilever beam and a tip, said tip being fixed to an end of said cantilever beam, characterized in that, said tip comprises a first portion of the tip and at least two second portions of the tip, said first portion comprising at least a first and a second surface, the first surface of the first portion of the tip being connected to said end of said cantilever beam, said second portions of the tip being placed on said second surface of said first portion of the tip, wherein each of said second portions of the tip are isolated one from another.

* * * * *